United States Patent [19]

Merrell

[11] Patent Number: 4,623,278

[45] Date of Patent: Nov. 18, 1986

[54] ANTI-BACKLASH DEVICE

[75] Inventor: Ronald W. Merrell, Banbury, England

[73] Assignee: Leslie Hartridge Ltd, Buckingham, England

[21] Appl. No.: 728,948

[22] Filed: Apr. 30, 1985

[30] Foreign Application Priority Data

Apr. 30, 1984 [GB] United Kingdom ............... 8411025

[51] Int. Cl.⁴ .................. F16B 7/00; F16H 27/03
[52] U.S. Cl. .................... 403/362; 403/383; 74/89.17; 74/422; 411/119; 411/129
[58] Field of Search .............. 403/359, 383, 362; 74/409, 422, 89, 17, 109; 411/119, 120, 128, 129

[56] References Cited

U.S. PATENT DOCUMENTS

| 2,177,865 | 10/1939 | Collon | 411/128 |
| 2,948,559 | 8/1960 | Recker | 403/359 |
| 3,012,825 | 12/1961 | Bullens | 403/362 |
| 3,621,939 | 11/1971 | Hughes | 74/422 |
| 3,992,119 | 11/1976 | Recker | 403/359 |
| 4,185,938 | 1/1980 | Pareja | 403/359 |

Primary Examiner—Cornelius J. Husar
Assistant Examiner—Peter M. Cuomo
Attorney, Agent, or Firm—Berman, Aisenberg & Platt

[57] ABSTRACT

An anti-backlash device for use in connecting a rotary drive to the drive shaft of a fuel injection pump, comprising a hub member within which at least one fixing pin is arranged to be moveable transversely of the hub axis, so that an abutment end of the fixing pin can be brought into contact with an end portion of such a drive shaft when the device is in use. Each fixing pin is in screwthreaded engagement with the hub member, and means are provided to rotate the or each fixing pin, thereby to bring about contact between the abutment end of the fixing pin and an end portion of such a drive shaft by virtue of the said screwthreaded engagement.

1 Claim, 7 Drawing Figures

ANTI-BACKLASH DEVICE

The present invention relates to an anti-backlash device for use in connecting a rotary drive to the drive shaft of a fuel injection pump, comprising a hub member within which at least one fixing pin is arranged to be moveable transversely of the hub axis, so that an abutment end of the fixing pin can be brought into contact with an end portion of such a drive shaft when the device is in use.

Examples of such a device are described in U.S. patent application Ser. Nos. 06/628,956 and 06/696,577, now U.S. Pat. No. 4,586,845, filed on 6th July, 1984 and 29th Jan., 1985 respectively. The devices described in both these co-pending Applications each include wedge or cam portions which drive the fixing pins into contact with such a drive shaft. As a result, any free-play between the rotary drive and the pump shaft is eliminated. This is desirable from the point of view of accuracy when the rotary drive is part of fuel injection pump testing equipment, in which a precise correlation between the rotary position of the drive and the rotary position of the pump shaft is required.

Figure 1:
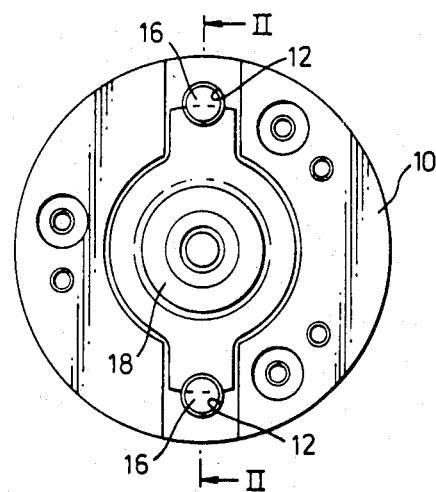
FIG. 1 is an end view of a prior art anti-backlash device using wedge or cam members

The prior art device comprises a hub member 10 adjacent to a periphery of which are formed diametrically opposite axially-extending bores 12. These accommodate respective wedges 14 provided on plungers 16. Each wedge 14 has an inwardly facing sloping surface 17. Each plunger 16 is slidable in an axial direction, and the sloping surfaces 17 are such that the wedges 14 taper towards their free ends. A bridge 18 has projecting portions 20 which engage internal recesses 22 of the plungers 16. The bridge 18 is urged inwardly, such as to drive the wedges 14 further into the bores 12, by a helical compression spring 24 when the device is in use. Transverse bores 26 extend radially inwardly from the bores 12 and are open at an internal periphery of the hub member. The axes of the two bores 26 are offset in relation to the axis of the hub member. Accommodated within the bores 26 are respective fixing pins 28 which have flat-bottomed ends 30 which face inwardly. Each pin tends to be held in a position in which the flat-bottomed end 30 is retracted a little from the interior end of the associated bore 26, by means of springs 32.

When the prior art device is positioned for use, the hub member 10 is slid over a free end of a pump shaft. The particular construction of the prior art anti-backlash device illustrated is appropriate for a tang ended pump shaft, and the prior art device is slid on to a tang end with opposite sides of the tang facing respectively towards the fixing pins 28. When a rotary drive is now coupled to the device, a helical compression spring 24 urges the bridge 18 in a direction towards the pump shaft so as to slide the plungers 16 in the same direction. As a result the sloping surfaces 17 of the wedges 14 act as cams and drive the fixing pins 28 inwardly until their flat-bottomed ends 30 contact the opposite sides of the tang end of the pump shaft.

This prior art device, along with those described and illustrated in U.S. patent application Ser. Nos. 06/628,956 and 06/696,577, now U.S. Pat. No. 4,586,845, suffer from the disadvantage that there is only a small surface area of contact between the wedges and the fixing pins, and if the outer ends of the fixing pins are dome-shaped, the contact area may be reduced, at least when the device is new, almost to a contact point. As a result, with continual use of the device, there is considerable wear at this contact area; so much so that the wear may be too great to be taken up by further sliding of the plungers 16 towards the pump shaft.

It is an aim of the present invention to reduce the extent to which an anti-backlash device is subject to this disadvantage.

Accordingly the present invention is directed to an anti-backlash device having the construction set out in the opening paragraph of the present specification, in which the or each fixing pin is in screwthreaded engagement with the hub member, and means are provided to rotate the or each fixing pin, thereby to bring about contact between the abutment end of the fixing pin and an end portion of such a drive shaft by virtue of the said screwthreaded engagement. For example, such means may comprise a pinion provided on the or each fixing pin, in which the pinion engages a rack of the device.

Figure 2:
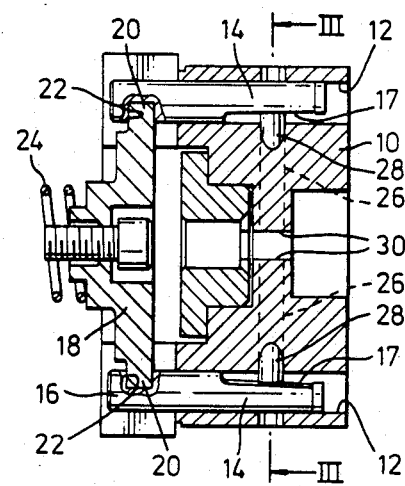
FIG. 2 is an axial-sectional view of the prior art device shown in FIG. 1 taken along the line II—II thereof.
Figure 3:
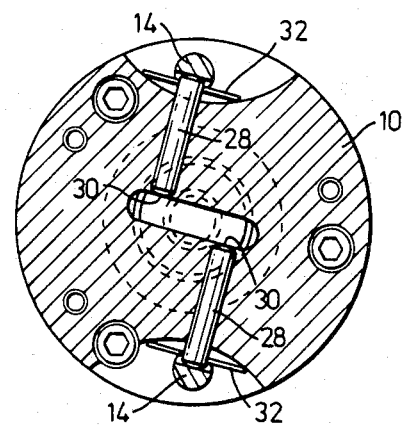
FIG. 3 is a cross-sectional view of the prior art device taken along the line III—III of FIG. 2
Figures 5, 6:
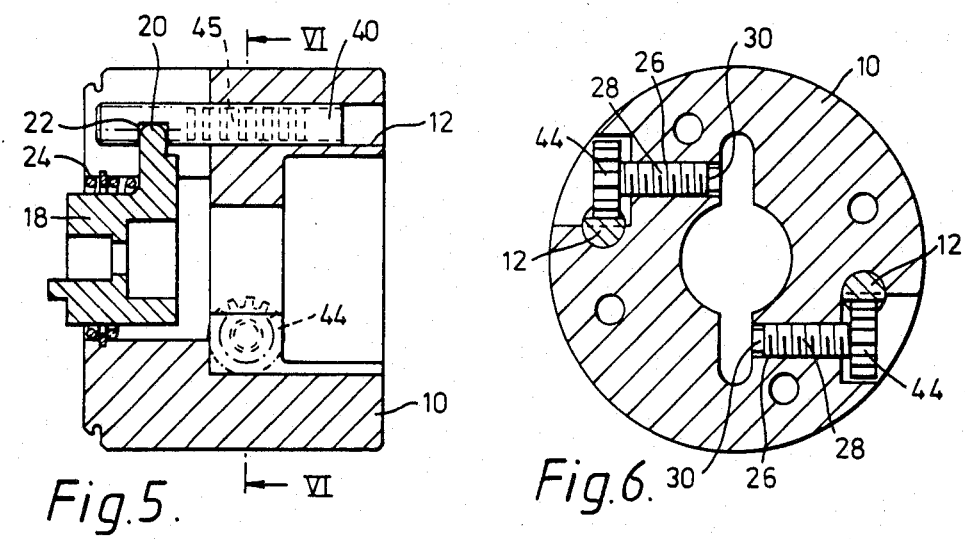
FIG. 5 is an axial-sectional view of the device of the present invention taken along the line V—V of FIG. 4.
FIG. 6 is a cross-sectional view of the device of the present invention taken along the line VI—VI of FIG. 5.

The anti-backlash device shown in FIGS. 4 to 7 has parts which correspond to those of the prior art device shown in FIGS. 1 to 3 labelled with the same reference numerals. The differences are as follows:

(a) the bridge 18 engages two rack members 40 (only one of which is shown in FIG. 5);

(b) each fixing pin 28 has an external screwthread 41 in engagement with an internal screwthread 42 of the bore 26;

(c) the outer ends of the fixing pins 28 are provided with pinions 44;

(d) the bores 26 are displaced further away from one another so that only side portions of the pinions 44 lie within the bores 12 to enable the pinions 44 to engage racks 45 of the rack members 40; and (e) the interior cavity of the hub member 10 is shaped to receive a wider tang end of a pump shaft.

Figure 4:
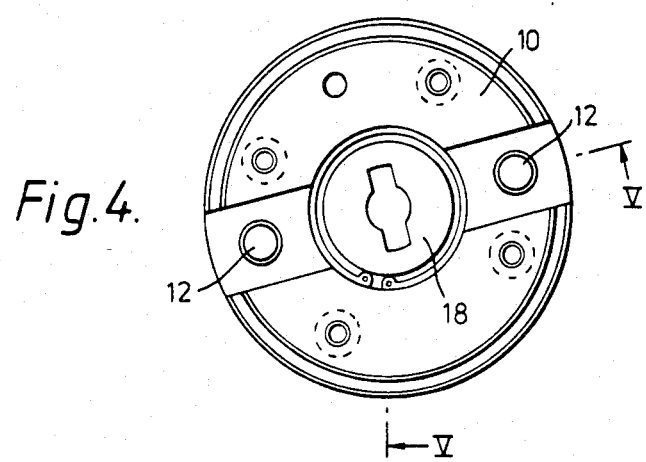
FIG. 4 shows an end view of the device of the present invention.
Figure 7:
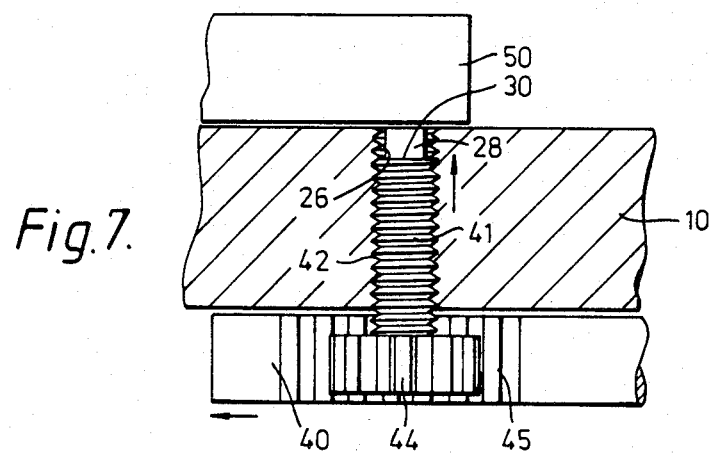
FIG. 7 is a diagrammatic illustration of the manner in which the device of the present invention operates.

The operation of the device of the present invention shown in FIGS. 4 to 6 can be seen more clearly from the diagram in FIG. 7. As the rack member 40 is moved leftwards in that Figure, the pinion 44 along with the rest of the fixing pin 28 is rotated in a clockwise sense to drive the fixing pin 28 in an upward direction with reference to that Figure, by virtue of its screwthreaded engagement with the hub member 10. This brings the flat end 30 of the pin 28 into contact with the tang end 50 of the pump shaft.

Various modifications to the construction of the illustrated device are possible without taking it outside the scope of the present invention. In one modification, the device can be adapted to engage a splined end of a pump shaft. In that case, the radial bores 26 would need to extend more closely along respective radii of the hub member 10, and the inner ends of the fixing pins would have to be symmetrically conical, so that those ends can engage between splines on the ends of the pump shaft in spite of rotation of the fixing pin 28 under the action of its associated rack member 40.

The device illustrated in FIGS. 4 to 7 is advantageous over the prior art device illustrated in FIGS. 1 to 3 in that the contact area which resists backlash is now spread over the whole of the screwthread engagement between each fixing pin 28 and the hub member 10. This is a much larger area than that between the pins 28 and the wedges 14 in the device illustrated in FIGS. 1 to 3. Accordingly, the device illustrated in FIGS. 4 to 7 will be more resistant to wear and will therefore have a longer life.

I claim:

1. An anti-backlash connecting member for use in connecting a rotary drive to a drive shaft, especially but not exclusively the drive shaft of a fuel injection pump, comprising:
    (a) a hub member;
    (b) at least one fixing pin arranged to be moveable within said hub member transversely of the hub axis;
    (c) an abutment end of said fixing pin which is brought into contact with an end portion of such a shaft when the device is in use;
    (d) a screwthreaded engagement between said hub member and said fixing pin;
    (e) a pinion which is provided on said fixing pin and which serves to rotate said fixing pin;
    (f) a rack which engages said pinion; and
    (g) spring loading means which urges said rack in a direction which rotates said fixing pin in the sense that brings about contact between said abutment end and an end portion of such a shaft by virtue of said screwthreaded engagement.

* * * * *